(12) United States Patent
Heo et al.

(10) Patent No.: US 9,894,385 B2
(45) Date of Patent: Feb. 13, 2018

(54) VIDEO SIGNAL PROCESSING METHOD AND DEVICE

(71) Applicant: LG ELECTRONICS INC., Seoul (KR)

(72) Inventors: Jin Heo, Seoul (KR); Jiwook Jung, Seoul (KR); Sehoon Yea, Seoul (KR); Moonmo Koo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 14/758,866

(22) PCT Filed: Jan. 2, 2014

(86) PCT No.: PCT/KR2014/000013
§ 371 (c)(1),
(2) Date: Sep. 24, 2015

(87) PCT Pub. No.: WO2014/107029
PCT Pub. Date: Jul. 10, 2014

(65) Prior Publication Data
US 2016/0073131 A1     Mar. 10, 2016

Related U.S. Application Data

(60) Provisional application No. 61/748,434, filed on Jan. 2, 2013, provisional application No. 61/810,722, filed on Apr. 11, 2013.

(51) Int. Cl.
*H04N 13/00* (2006.01)
*H04N 5/917* (2006.01)
(Continued)

(52) U.S. Cl.
CPC ....... *H04N 19/597* (2014.11); *H04N 13/0022* (2013.01); *H04N 19/44* (2014.11); *H04N 13/0048* (2013.01); *H04N 2213/003* (2013.01)

(58) Field of Classification Search
None
See application file for complete search history.

(56) References Cited

U.S. PATENT DOCUMENTS

2010/0232516 A1* 9/2010 Tojima ............... H03M 7/4006
375/240.25
2010/0238056 A1* 9/2010 Seki ..................... H04N 19/176
341/107

(Continued)

FOREIGN PATENT DOCUMENTS

KR   10-2010-0102516 A   9/2010
KR   10-2012-0004781 A   1/2012
(Continued)

OTHER PUBLICATIONS

Jager, Fabian, "Simplified Depth Map Intra Coding With an Optional Depth Lookup Table," IEEE, 2012, 4 pages.*

(Continued)

*Primary Examiner* — Hung Dang
(74) *Attorney, Agent, or Firm* — Dentons US LLP (57) ABSTRACT

The present invention relates to a video signal processing method and device and is capable of acquiring differential depth index information on the basis of a predetermined binarization method, acquiring a differential depth value by using the differential depth index information, acquiring the depth value of a current depth block by using the differential depth value, and decoding the current depth block by using the depth value of the current depth block. The present invention can increase encoding efficiency.

10 Claims, 5 Drawing Sheets

(51) Int. Cl.
*H04N 19/597* (2014.01)
*H04N 19/44* (2014.01)

(56) References Cited

U.S. PATENT DOCUMENTS

| | | | | |
|---|---|---|---|---|
| 2011/0254923 A1* | 10/2011 | Choi | ................... | H04N 13/0207 |
| | | | | 348/46 |
| 2011/0255592 A1* | 10/2011 | Sung | ................... | H04N 13/0011 |
| | | | | 375/240.02 |
| 2011/0317766 A1* | 12/2011 | Lim | ..................... | H04N 19/597 |
| | | | | 375/240.16 |
| 2012/0093226 A1 | 4/2012 | Chien et al. | | |
| 2012/0328022 A1* | 12/2012 | Sasai | ...................... | H04N 19/52 |
| | | | | 375/240.16 |
| 2013/0003840 A1* | 1/2013 | Gao | ....................... | H04N 19/50 |
| | | | | 375/240.12 |
| 2013/0148742 A1* | 6/2013 | Sasai | ...................... | H04N 19/46 |
| | | | | 375/240.25 |
| 2013/0188013 A1* | 7/2013 | Chen | .................... | H04N 19/597 |
| | | | | 348/43 |
| 2013/0272389 A1* | 10/2013 | Sze | ......................... | H04N 19/91 |
| | | | | 375/240.03 |
| 2013/0336386 A1* | 12/2013 | Chong | ............. | H04N 19/00066 |
| | | | | 375/240.02 |
| 2013/0343463 A1* | 12/2013 | Terada | ................. | H04N 19/463 |
| | | | | 375/240.18 |
| 2014/0009467 A1* | 1/2014 | Akenine-Moller | .. | H04N 19/597 |
| | | | | 345/422 |
| 2014/0192861 A1* | 7/2014 | Chuang | ............... | H03M 7/4018 |
| | | | | 375/240.02 |
| 2015/0110198 A1* | 4/2015 | Kim | ....................... | H04N 19/91 |
| | | | | 375/240.18 |
| 2015/0229957 A1* | 8/2015 | Zhao | .................... | H04N 19/597 |
| | | | | 375/240.12 |

FOREIGN PATENT DOCUMENTS

KR 10-2012-0080140 A 7/2012
KR 10-2012-0118432 A 10/2012

OTHER PUBLICATIONS

Nguyen et al., "Reduced-Complexity Entropy Coding of Transform Coefficient Levels Using Truncated Golomb-Rice Codes in Video Compression", 2011, $18^{th}$ IEEE International Conference on Image Processing, pp. 753-756.*

* cited by examiner

VIDEO SIGNAL PROCESSING METHOD AND DEVICE

This application is a U.S. National Phase Application under 35 U.S.C. § 371 of International Application PCT/KR2014/000013, filed on Jan. 2, 2014, which claims the benefit of U.S. Provisional Application No. 61/748,434, filed on Jan. 2, 2013, and U.S. Provisional Application No. 61/810,722 filed on Apr. 11, 2013, the entire content of the prior applications is hereby incorporated by reference.

TECHNICAL FIELD

The present invention relates to a method and device for coding video signals.

BACKGROUND ART

Compression refers to a signal processing technique for transmitting digital information through a communication line or storing the digital information in a form suitable for a storage medium. Compression targets include audio, video and text information. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention provides a video signal processing method and device for encoding or decoding a depth value of a current depth block using a predetermined binarization codeword.

In addition, the present invention provides a video signal processing method and device using a context model for encoding binarized depth related information.

Furthermore, the present invention provides a video signal processing method and device for transforming depth index information into a depth value or indexing a depth value into index information using predetermined table information.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

The present invention can reduce the number of bits of depth related information using a predetermined binarization codeword and a context model to which characteristics of depth values are applied and can improve coding efficiency.

The effects of the present invention are not limited to the above-described effects and other effects which are not described herein will become apparent to those skilled in the art from the following description.

BEST MODE

The present invention provides a method for processing video signals, including: acquiring differential depth index information on the basis of a predetermined binarization method, wherein the predetermined binarization method refers to a coding method using a combination of unary binarization and fixed length binarization; acquiring a differential depth value using the differential depth index information; acquiring a depth value of a current depth block using the differential depth value; and decoding the current depth block using the depth value of the current depth block, and a video decoder.

The method may further include acquiring a predicted depth value of the current depth block, wherein the depth value of the current depth block is acquired further using the predicted depth value.

The method may further include acquiring maximum differential depth index information, wherein the predetermined binarization method uses the maximum differential depth index information.

The acquiring of the differential depth value using the differential depth index information may include: generating a lookup table; transforming the differential depth index information into the differential depth value using the lookup table; and updating the lookup table.

Modes for Invention

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted within the technical spirit and technical scope of the present invention.

Figure 1:
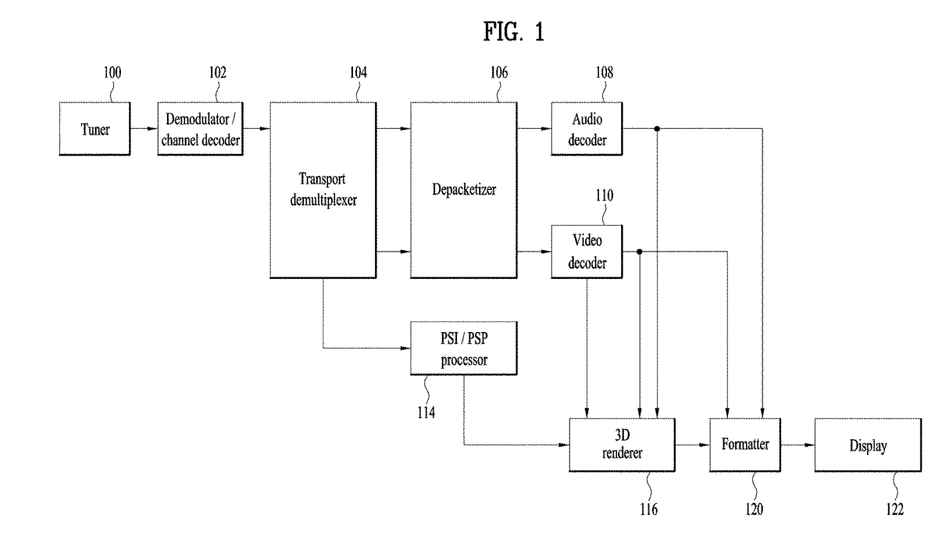
FIG. 1 is a block diagram of a broadcast receiver to which depth coding is applied according to an embodiment of the present invention.

FIG. 1 is a block diagram of a broadcast receiver to which depth coding is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 100, a demodulator/channel decoder 102, a transport demultiplexer 104, a depacketizer 106, an audio decoder 108, a video decoder 110, a PSI/PSIP processor 114, a 3D renderer 116, a formatter 120 and a display 122.

The tuner 100 selects a broadcast signal of a channel tuned to by a user from among a plurality of broadcast signals input through an antenna (not shown) and outputs the selected broadcast signal. The demodulator/channel decoder 102 demodulates the broadcast signal from the tuner 100 and performs error correction decoding on the demodulated signal to output a transport stream TS. The transport demultiplexer 104 demultiplexes the transport stream so as to divide the transport stream into a video PES and an audio PES and extract PSI/PSIP information. The depacketizer 106 depacketizes the video PES and the audio PES to restore a video ES and an audio ES. The audio decoder 108 outputs an audio bitstream by decoding the audio ES. The audio bitstream is converted into an analog audio signal by a digital-to-analog converter (not shown), amplified by an amplifier (not shown) and then output through a speaker (not shown). The video decoder 110 decodes the video ES to restore the original image. The decoding processes of the audio decoder 108 and the video decoder 110 can be performed on the basis of a packet ID (PID) confirmed by the PSI/PSIP processor 114. During the decoding process, the video decoder 110 can extract depth information. In addition, the video decoder 110 can extract additional information necessary to generate an image of a virtual camera view, for example, camera information or information for estimating an occlusion hidden by a front object (e.g. geometrical information such as object contour, object transparency information and color information), and provide the additional information to the 3D renderer 116. However, the depth information and/or the additional information may be separated from each other by the transport demultiplexer 104 in other embodiments of the present invention.

The PSI/PSIP processor 114 receives the PSI/PSIP information from the transport demultiplexer 104, parses the PSI/PSIP information and stores the parsed PSI/PSIP information in a memory (not shown) or a register so as to enable broadcasting on the basis of the stored information. The 3D renderer 116 can generate color information, depth information and the like at a virtual camera position using the restored image, depth information, additional information and camera parameters.

In addition, the 3D renderer 116 generates a virtual image at the virtual camera position by performing 3D warping using the restored image and depth information regarding the restored image. While the 3D renderer 116 is configured as a block separated from the video decoder 110 in the present embodiment, this is merely an example and the 3D renderer 116 may be included in the video decoder 110.

The formatter 120 formats the image restored in the decoding process, that is, the actual image captured by a camera, and the virtual image generated by the 3D renderer 116 according to the display mode of the broadcast receiver such that a 3D image is displayed through the display 122. Here, synthesis of the depth information and virtual image at the virtual camera position by the 3D renderer 116 and image formatting by the formatter 120 may be selectively performed in response to a user command. That is, the user may manipulate a remote controller (not shown) such that a composite image is not displayed and designate an image synthesis time.

As described above, the depth information for generating the 3D image is used by the 3D renderer 116. However, the depth information may be used by the video decoder 110 in other embodiments. A description will be given of various embodiments in which the video decoder 110 uses the depth information.

Figure 2:
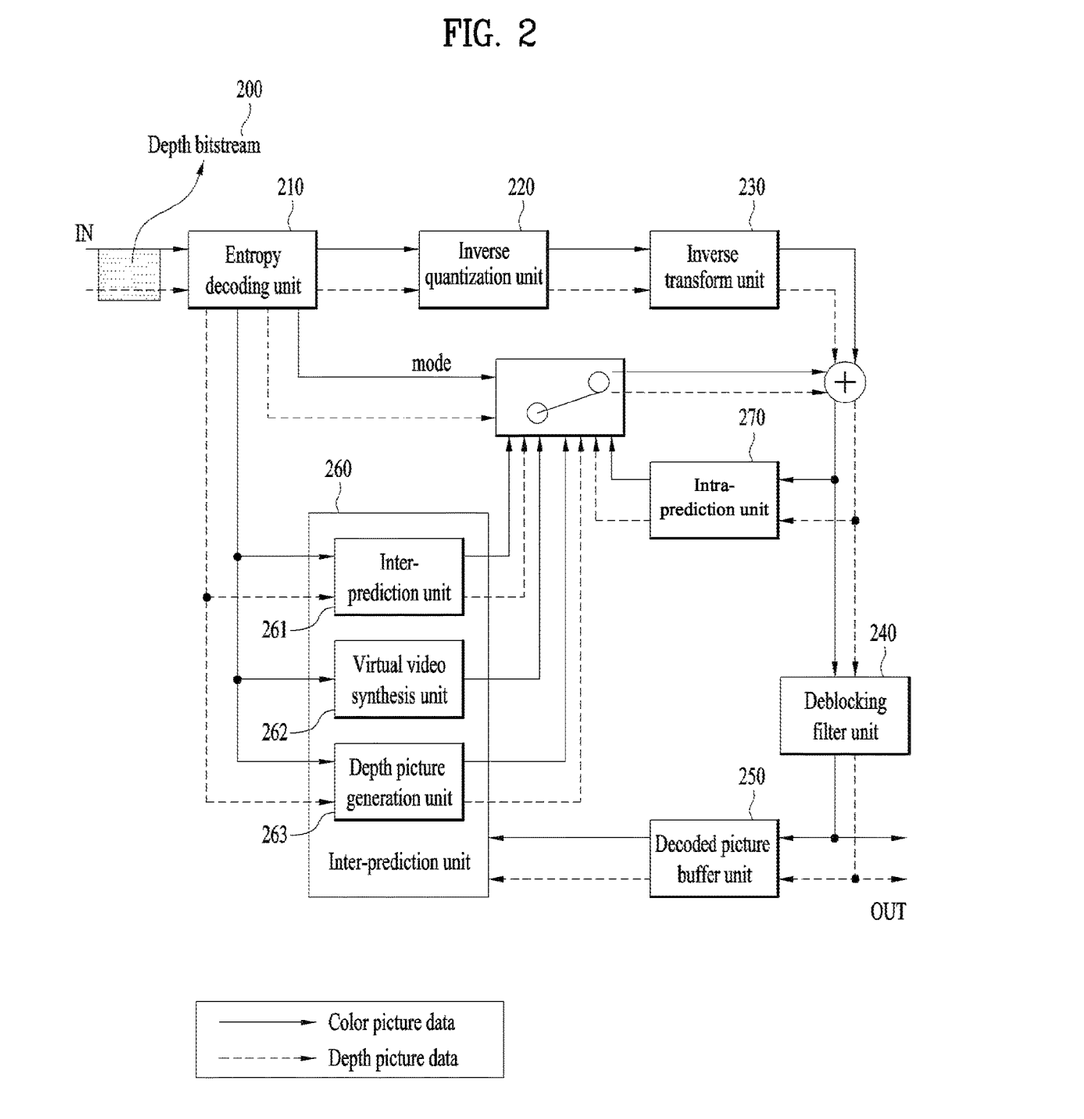
FIG. 2 is a block diagram of a video decoder according to an embodiment of the present invention.

FIG. 2 is a block diagram of the video decoder according to an embodiment to which the present invention is applied.

Referring to FIG. 2, the video decoder 110 may include an entropy decoding unit 210, an inverse quantization unit 220, an inverse transform unit 230, a deblocking filter unit 240, a decoded picture buffer unit 250, an inter-prediction unit 260 and an intra-prediction unit 270. In FIG. 2, solid lines represent flow of color picture data and dotted lines represent flow of depth picture data. While the color picture data and the depth picture data are separately represented in FIG. 2, separate representation of the color picture data and the depth picture data may refer to separate bitstreams or separate flows of data in one bitstream. That is, the color picture data and the depth picture data can be transmitted as one bitstream or separate bitstreams. FIG. 2 only shows data flows and does not limit operations to operation performed in one decoder.

First of all, to decode a received depth bitstream 200, the depth bitstream 200 is parsed per NAL. Here, various types of attribute information regarding depth may be included in an NAL header region, an extended region of the NAL header, a sequence header region (e.g. sequence parameter set), an extended region of the sequence header, a picture header region (e.g. picture parameter set), an extended region of the picture header, a slice header region, an extended region of the slice header, a slice data region or a macro block region. While depth coding may be performed using a separate codec, it may be more efficient to add attribute information regarding depth only in the case of a depth bitstream if compatibility with existing codecs is achieved. For example, depth identification information for identifying a depth bitstream can be added to the sequence header region (e.g. sequence parameter set) or the extended region of the sequence header. Attribute information regarding a depth sequence can be added only when an input bitstream is a depth coded bitstream, according to the depth identification information.

The parsed depth bitstream 200 is entropy-decoded through the entropy decoding unit 210 and a coefficient, a motion vector and the like of each macro block are extracted. The inverse quantization unit 220 multiplies a received quantized value by a predetermined constant so as to obtain a transformed coefficient and the inverse transform unit 230 inversely transforms the coefficient to restore depth information of a depth picture. The intra-prediction unit 270 performs intra-prediction using the restored depth information of the current depth picture. The deblocking filter unit 240 applies deblocking filtering to each coded macro block in order to reduce block distortion. The deblocking filter unit improves the texture of a decoded frame by smoothing edges of blocks. A filtering process is selected depending on boundary strength and an image sample gradient around a boundary. Filtered depth pictures are output or stored in the decoded picture buffer unit 250 to be used as reference pictures.

The decoded picture buffer unit 250 stores or opens previously coded depth pictures for inter-prediction. Here, to store coded depth pictures in the decoded picture buffer unit 250 or to open stored coded depth pictures, frame_num and POC (Picture Order Count) of each picture are used. Since the previously coded pictures may include depth pictures corresponding to views different from the current depth picture, depth view information for identifying views of depth pictures as well as frame_num and POC can be used in order to use the previously coded pictures as reference pictures in depth coding.

In addition, the decoded picture buffer unit 250 may use the depth view information in order to generate a reference picture list for inter-view prediction of depth pictures. For example, the decoded picture buffer unit 250 can use depth-view reference information. The depth-view reference information refers to information used to indicate inter-view dependence of depth pictures. For example, the depth-view reference information may include the number of depth views, a depth view identification number, the number of depth-view reference pictures, depth view identification numbers of depth-view reference pictures and the like.

The decoded picture buffer unit 250 manages reference pictures in order to implement more flexible inter-prediction. For example, a memory management control operation method and a sliding window method can be used. Reference picture management unifies a reference picture memory and a non-reference picture memory into one memory and manages the unified memory so as to achieve efficient management with a small-capacity memory. In depth coding, depth pictures can be separately marked to be discriminated from color pictures in the decoded picture buffer unit and information for identifying each depth picture can be used in the marking process. Reference pictures managed through the aforementioned procedure can be used for depth coding in the inter-prediction unit 260.

Referring to FIG. 2, the inter-prediction unit 260 may include a motion compensation unit 261, a virtual view synthesis unit 262 and a depth picture generation unit 263.

The motion compensation unit 261 compensates for motion of the current block using information transmitted from the entropy decoding unit 210. The motion compensation unit 261 extracts motion vectors of neighboring blocks of the current block from a video signal and acquires a motion vector prediction value of the current block. The motion compensation unit 261 compensates for motion of the current block using the motion vector prediction value and a differential vector extracted from the video signal. Motion compensation may be performed using one reference picture or a plurality of pictures. In depth coding, motion compensation can be performed using information on a reference picture list for inter-view prediction of depth pictures stored in the decoded picture buffer unit 250 when the current depth picture refers to a depth picture of a different view. Further, motion compensation may be performed using depth view information for identifying the view of the depth picture.

The virtual view synthesis unit 262 synthesizes a color picture of a virtual view using color pictures of neighboring views of the view of the current color picture. To use the color pictures of the neighboring views or to use color pictures of a desired specific view, view identification information indicating the views of the color pictures can be used. When the color picture of the virtual view is generated, flag information indicating whether the color picture of the virtual view is generated can be defined. When the flag information indicates generation of the color picture of the virtual view, the color picture of the virtual view can be generated using the view identification information. The color picture of the virtual view, acquired through the virtual view synthesis unit 262, may be used as a reference picture. In this case, the view identification information can be assigned to the color picture of the virtual view.

In another embodiment, the virtual view synthesis unit 262 can synthesize a depth picture of a virtual view using depth pictures corresponding to neighboring views of the view of the current depth picture. In this case, depth view identification information indicating the view of a depth picture can be used. Here, the depth view identification information can be derived from view identification information of a corresponding color picture. For example, the corresponding color picture can have the same picture output order information and the same view identification information as those of the current depth picture.

The depth picture generation unit 263 can generate the current depth picture using depth coding information. Here, the depth coding information may include a distance parameter indicating a distance between a camera and an object (e.g. a Z-coordinate value on a camera coordinate system or the like), macro block type information for depth coding, information for identifying a boundary in a depth picture, information indicating whether data in RBSP includes depth-coded data, information indicating whether a data type is depth picture data, color picture data or parallax data and the like. In addition, the current depth picture may be predicted using the depth coding information. That is, inter-prediction using neighboring depth pictures of the current depth picture can be performed and intra-prediction using decoded depth information in the current depth picture can be performed.

A description will be given of context-based adaptive binary arithmetic coding (CABAC) with reference to FIG. 3.

Figure 3:
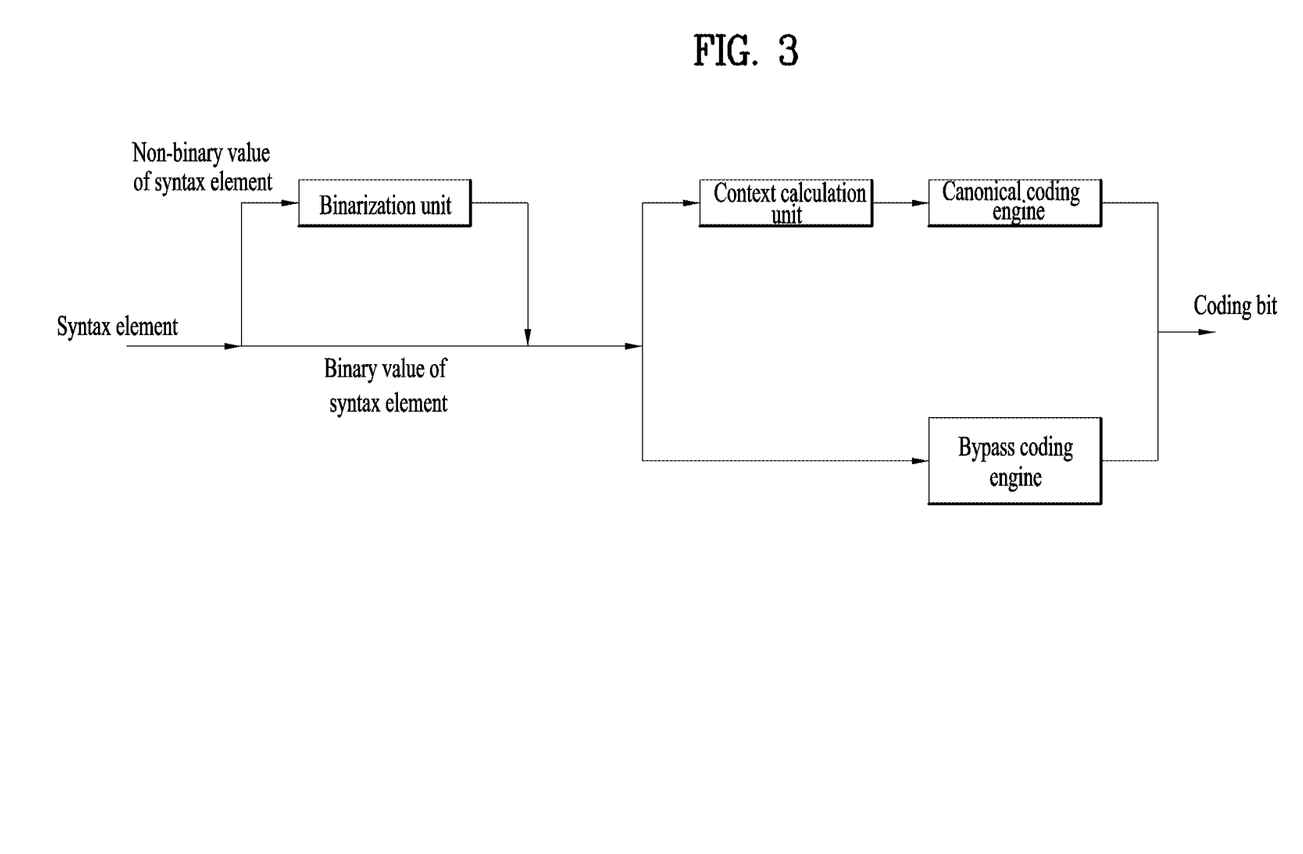
FIG. 3 illustrates an exemplary context-based adaptive binary arithmetic coding method for coding a syntax element according to an embodiment to which the present invention is applied.

FIG. 3 illustrates an exemplary context-based adaptive binary arithmetic coding (CABAC) method for coding a syntax element according to an embodiment to which the present invention is applied.

CABAC may be composed of binarization, context modeling, binary arithmetic coding and probability update. In the binarization stage, a syntax element having a non-binary value can be transformed into a binarized sequence called a bin string through a binarization unit. When a binarized syntax element is provided as an input signal, the binarization stage can be skipped. For each element of the bin string or each syntax element, the following stages are determined according to coding mode. The coding mode includes a canonical coding mode and a bypass coding mode.

Prior to execution of arithmetic coding, a given bin value is applied to a context model stage. Here, a bin represents a bit of each bin string generated in the binarization stage. A context model corresponding to a current bin value can be selected by a precoded syntax element or bin value in the context model stage. Upon determination of the context model, bins according to the determined context model and a given context model are input to a canonical coding engine. Then, binary arithmetic coding is carried out using the input bins and the context model, and a context model update stage is performed.

Coding methods including bypass coding. When the bypass coding mode is selected for a given bin value, a simplified coding engine is applied since a context model of a preceding syntax element is not used. Accordingly, rapid coding can be achieved.

The binarization unit can perform binarization by applying different binary coding methods according to syntax elements. Accordingly, it is important to select an appropriate binary coding method according to syntax element. For example, when differential depth index information is binarized, fixed length binarization can be used. Fixed length binarization is advantageous to code symbols having a uniform probability distribution. However, since the differential depth index information has a Laplacian probability distribution, coding efficiency may be deteriorated when binarization is performed using fixed length binarization.

In general, depth values in a depth picture are focused on a specific region rather than being uniformly distributed in the range of 0 to 255. The number of bits during coding may be reduced by indexing depth values and predicted depth values using a look-up table created in consideration of such characteristics of depth values. In addition, it is possible to efficiently encode and decode depth related information by finalizing depth values on the basis of the characteristics of depth values. A description will be given of an example of reconstructing a current depth block using a depth value binarization method according to the present invention.

Figure 4:
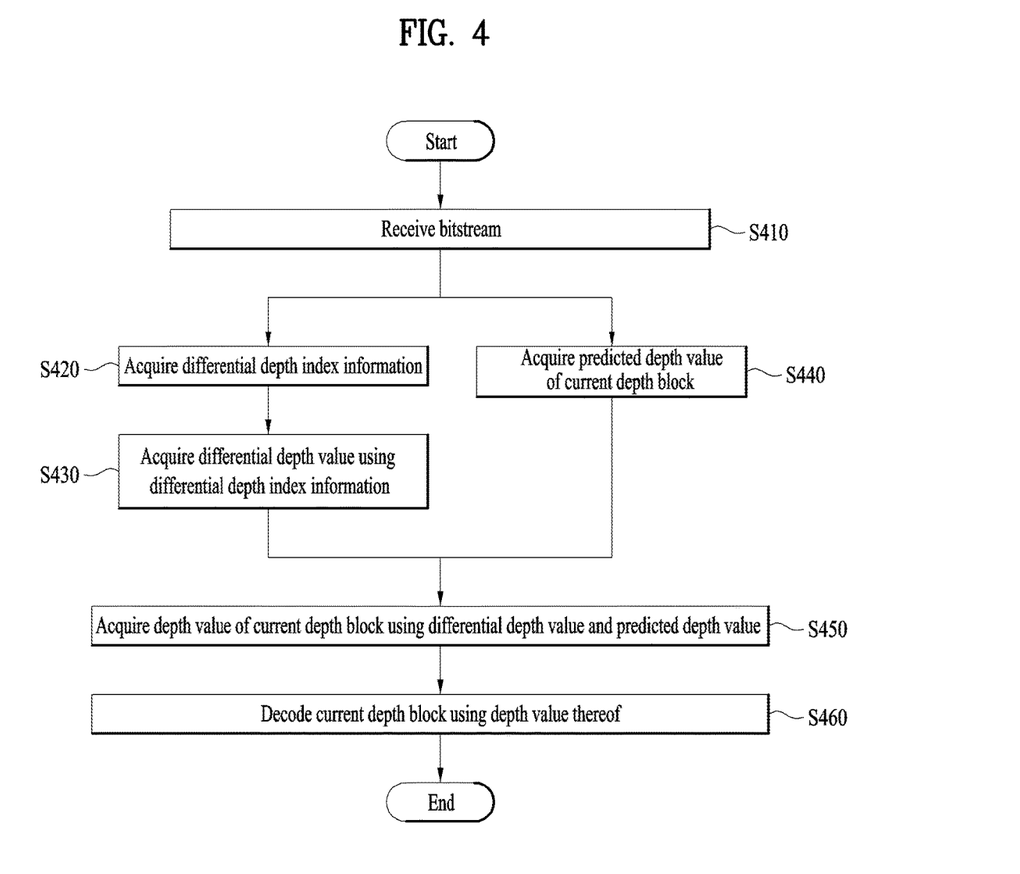
FIG. 4 is a flowchart illustrating an example of decoding a current depth block according to an embodiment to which the present invention is applied.

FIG. 4 is a flowchart illustrating an example of reconstructing the current depth block according to an embodiment to which the present invention is applied.

A bitstream including an encoded signal may be received (S410). The bitstream may include information regarding multiview video reconstruction.

Differential depth index information may be acquired from the bitstream using a concatenation binarization method (S420). The differential depth index information represents a difference between depth index information and predicted depth index information. The differential index information can be binarized through concatenation binarization. Accordingly, the entropy decoding unit can acquire the differential index information using concatenation binarization.

Concatenation binarization is a method of binarizing only a prefix part using unary binarization only for a specific value and binarizing a prefix part using unary binarization and binarizing a suffix part using fixed length binarization for a specific value. Here, unary binarization is a method of binarizing a specific value into an array of as many 1s as a value smaller than the specific value by 1 and the last 0. Fixed length binarization is a method of binarizing a specific value by a fixed length. A value binarized through fixed length binarization has a binary string corresponding to the fixed length.

A region binarized only using prefix parts may correspond to ¾ of total depth index information and a region binarized including suffix parts may correspond to the remaining ¼ of the total depth index information. For example, when depth values are converted into depth index information 1 to 12, as shown in Table 1, depth index information 1 to 9 corresponding to ¾ of depth index information included in a depth picture can be binarized using only prefix parts through unary binarization.

Furthermore, depth index information can be divided into a depth index information region including only prefix parts binarized through unary binarization and a depth index information region binarized through fixed length binarization, using a maximum value of the depth index information through Equation 1.

$$cMaxPrefix=(numDepthValues*3)>>2 \quad \text{[Equation 1]}$$

In Equation 1, numDepthValues denotes the number of pieces of depth index information or maximum depth index information corresponding to a maximum value of the depth index information and cMaxPrefix denotes a maximum value of depth index information binarized using only prefix parts. For example, when the number of pieces of depth index information is 12, it is possible to acquire a maximum value of 9 of the depth index information binarized using only prefix parts through Equation 1. Accordingly, it is possible to obtain only prefix parts binarized through unary binarization for the depth index information of 1 to 9 and to obtain prefix parts and suffix parts binarized through fixed length binarization for the depth index information of 10 to 12.

The following table 1 shows exemplary depth index information binarized according to the aforementioned concatenation binarization method.

TABLE 1

| Depth index information | Prefix part | Suffix part |
| --- | --- | --- |
| 1 | 0 | |
| 2 | 10 | |
| 3 | 110 | |
| 4 | 1110 | |
| 5 | 11110 | |
| 6 | 111110 | |
| 7 | 1111110 | |
| 8 | 11111110 | |
| 9 | 111111110 | |
| 10 | 111111111 | 00 |
| 11 | 111111111 | 01 |
| 12 | 111111111 | 10 |

Unary binarization can binarize depth index information into as many 1 s as a value corresponding to depth index information and the last 0. For example, depth index information 6 can be binarized into 111110 consisting of 5 1s and the last 0. The depth index information 10 to 12 can be binarized by being divided into prefix parts (111111) represented through unary binarization and suffix parts represented through fixed length binarization. Fixed length binarization can binarize depth index information into a fixed length corresponding to a maximum value. A suffix part value of depth index information can be acquired using Equation 2.

$$\text{Suffix part value}=\text{depth index information}-cMaxPrefix-1 \quad \text{[Equation 2]}$$

For example, with respect to depth index information 11, a suffix part value of 1 is acquired through Equation 2. Accordingly, the depth index information 11 can be binarized into 1111111101 including a suffix part 01 having a fixed length of 2.

A differential depth value may be acquired using the differential depth index information (S430). The differential depth index information is depth related information obtained by indexing differential depth values through a lookup table, and thus the differential depth value can be obtained by transforming the differential depth index information using the lookup table. Here, the lookup table is a table including predetermined values for transforming a depth value into depth index information or transforming depth index information into the depth value.

The lookup table can be generated on the basis of predetermined pictures. However, an inappropriate lookup table may deteriorate efficiency when characteristics of pictures used to generate the lookup table differ from those of pictures that do not affect generation of the lookup table. To solve this problem, the lookup table may be periodically updated in the indexing process. 1) The lookup table may be updated on a picture basis or 2) the lookup table may be updated on an intra picture cycle.

The first method of updating the lookup table on a picture basis is described. Depth values in a depth picture are searched while the depth picture is indexed according to the lookup table. When the searched depth values are not present in the lookup table, the lookup table is updated by adding depth index information corresponding to the depth values to the lookup table. In addition, depth index information, which is present in the lookup table but is not used for the depth picture, is removed so as to update the lookup table. The lookup table can be continuously updated during the procedure of searching and indexing depth values on a picture basis.

The second method of updating the lookup table on an intra picture cycle is described. For example, when the intra picture cycle is 16, the lookup table can be updated for every 16 pictures. In this case, the lookup table can be updated on the basis of presence or absence of depth values in the lookup table as in the first method.

A predicted depth value of the current depth block may be acquired (S440). The intra-prediction unit performs intra-prediction that predicts the depth value of the current depth block from reconstructed regions in the current depth picture. For example, the depth value of the current depth block can be predicted from encoded depth values of blocks disposed at the top, left, left top and/or right top of the current depth block.

Intra-prediction modes can be classified into vertical, horizontal, DC and angular modes according to directions of reference regions in which reference pixels used for depth value prediction are positioned and prediction methods. A value of a vertically neighboring region of the current depth block is used as a predicted value of the current depth block in the vertical mode, and a horizontally neighboring region is used as a reference region in the horizontal mode. In the DC mode, an average of reference regions is used as a predicted value. In the angular mode in which a reference region is positioned in an arbitrary direction, the direction can be indicated by an angle between the current depth value and a reference pixel. For convenience, predetermined angles and prediction mode numbers can be used and the number of used angles can depend on the size of the current depth block.

A depth value of the current depth block may be acquired using the differential depth value and the predicted depth value (S450). The depth value of the current depth block may be acquired as the sum of the differential depth value and the predicted depth value.

The current depth block may be decoded using the depth values thereof (S460).

A depth block decoding process is a reverse of a depth block encoding process. A description will be given of an example of encoding a depth value.

Figure 5:
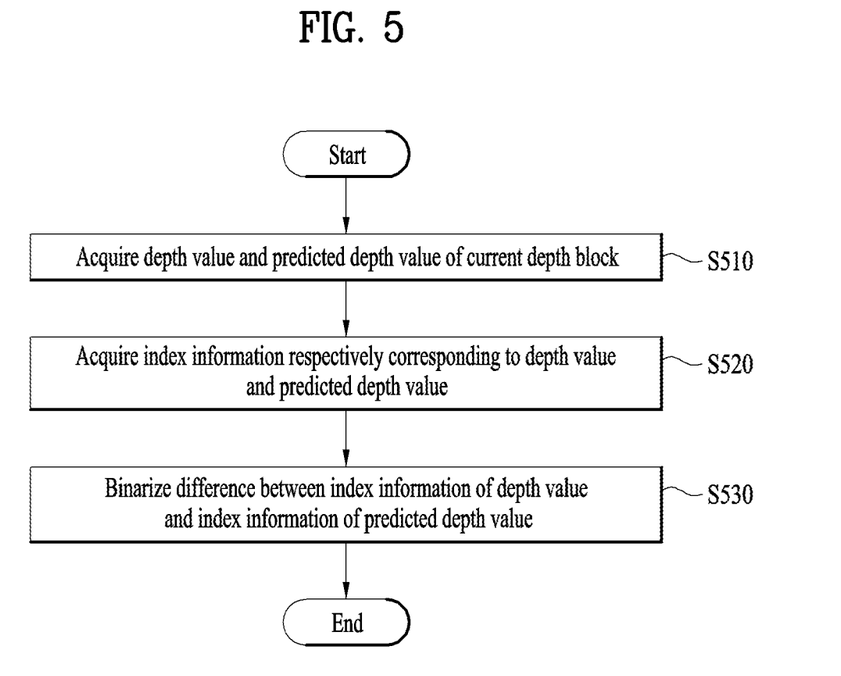
FIG. 5 is a flowchart illustrating an example of coding the current depth block according to an embodiment to which the present invention is applied.

FIG. 5 is a flowchart illustrating an example of encoding the current depth block according to an embodiment to which the present invention is applied.

A depth value and a predicted depth value of the current depth block may be acquired (S510). The depth value represents an actual depth value of the current depth block and the predicted depth value represents a depth value of the current depth block, which is predicted through intra-prediction.

The acquired depth value and predicted depth value may be indexed to obtain depth index information and predicted depth index information (S520). The indexing process in this step may include the process of respectively transforming a depth value and a predicted depth value into depth index information and predicted depth index information using the lookup table, described in step S430 of FIG. 4.

Differential depth index information using the depth index information and the predicted depth index information may be acquired and the differential depth index information may be binarized (S530). The differential depth index information may be obtained as a difference between the depth index information and the predicted depth index information. In addition, the differential depth index information may be binarized using the concatenation binarization described in step S420 of FIG. 4.

A context model of a binary signal may be acquired using the binarized differential depth index information (not shown). The differential depth index information is divided into a prefix part binarized through unary binarization and a suffix part binarized through fixed length binarization according to the concatenation binarization method described in step S420 of FIG. 4. Unary binarization used to binarize the prefix part generates many 1s, and thus a probabilistic distribution may be uneven. Accordingly, efficient encoding can be performed using a small number of context models. Fixed length binarization used to binarize the suffix part has a 50:50 probability of generating 0/1, and thus can perform encoding using the same context model. The context model according thereto is shown in Table 2.

TABLE 2

|  | Context index of differential index information (ctxIdx) | | |
| --- | --- | --- | --- |
| Initialization variable | 0 | 1 | 2 |
| Initial value | 155 | 155 | 155 |

When all depth index information (1~12) is binarized using fixed length binarization, 60 context models need to be defined. However, according to the binarization method provided by the present invention, the number of context models can be 20 times reduced, as shown in Table 2, compared to fixed length binarization.

As described above, the decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission over the Internet). In addition, a bitstream generated according to the encoding method may be stored in a computer-readable recording medium or transmitted using a wired/wireless communication network.

INDUSTRIAL APPLICABILITY

The present invention can be used to code a video signal.

The invention claimed is:

1. A method for processing video signals by a video decoder, comprising:
acquiring differential depth index information by transforming binary codes into the differential depth index information using a lookup table, wherein the look up table defines each of the differential depth index information corresponding to a respective binary code;
acquiring a differential depth value using the differential depth index information;
acquiring a depth value of a current depth block using the differential depth value; and
decoding the current depth block using the depth value of the current depth block,
wherein a part of binary codes in the lookup table are comprised just a prefix part, and a rest of binary codes in the lookup table are comprised the prefix part and a suffix part,
wherein a number of the binary codes which are comprised just the prefix part is larger than a number of the binary codes which are comprised the prefix part and the suffix part, and
wherein the prefix part is binarized using a unary binarization and the suffix part is binarized using fixed length binarization.

2. The method according to claim 1, further comprising acquiring a predicted depth value of the current depth block, wherein the depth value of the current depth block is acquired further using the predicted depth value.

3. The method according to claim 1, further comprising acquiring maximum differential depth index information, wherein the predetermined binarization method uses the maximum differential depth index information.

4. The method according to claim 1, wherein the lookup table is configured as follows:

| Depth index information | Prefix part | Suffix part |
| --- | --- | --- |
| 1 | 0 | |
| 2 | 10 | |
| 3 | 110 | |
| 4 | 1110 | |
| 5 | 11110 | |
| 6 | 111110 | |
| 7 | 1111110 | |
| 8 | 11111110 | |
| 9 | 111111110 | |
| 10 | 111111111 | 00 |
| 11 | 111111111 | 01 |
| 12 | 111111111 | 10 | wherein the number of the binary codes which are comprised just the prefix part is ¾ of a total number of the depth index information included in the lookup table, and
wherein the number of the binary codes which are comprised the prefix part and the suffix part is ¼ of the total number of the depth index information included in the lookup table.

5. A method for processing video signals by a video decoder, comprising:
acquiring a depth value and a predicted depth value of a current depth block;
acquiring depth index information and predicted depth index information using the depth value and the predicted depth value;
acquiring differential depth index information using the depth index information and the predicted depth information; and
acquiring binary codes by transforming the differential depth index information into the binary codes using a lookup table, wherein the look up table defines each of the differential depth index information corresponding to a respective binary code,
wherein a part of binary codes in the lookup table are comprised just a prefix part, and a rest of binary codes in the lookup table are comprised the prefix part and a suffix part,
wherein a number of the binary codes which are comprised just the prefix part is larger than a number of the binary codes which are comprised the prefix part and a suffix part, and
wherein the prefix part is binarized using a unary binarization and the suffix part is binarized using fixed length binarization.

6. The method according to claim 5, wherein the lookup table is configured as follows:

| Depth index information | Prefix part | Suffix part |
| --- | --- | --- |
| 1 | 0 | |
| 2 | 10 | |
| 3 | 110 | |
| 4 | 1110 | |
| 5 | 11110 | |
| 6 | 111110 | |
| 7 | 1111110 | |
| 8 | 11111110 | |
| 9 | 111111110 | |
| 10 | 111111111 | 00 |
| 11 | 111111111 | 01 |
| 12 | 111111111 | 10 | wherein the number of the binary codes which are comprised just the prefix part is ¾ of a total number of the depth index information included in the lookup table, and
wherein the number of the binary codes which are comprised the prefix part and the suffix part is ¼ of the total number of the depth index information included in the lookup table.

7. A video decoder, comprising:
an entropy decoding unit for acquiring differential depth index information by transforming binary codes into the differential depth index information using a lookup table, wherein the look up table defines each of the differential depth index information corresponding to a respective binary code; and
an intra-prediction unit for acquiring a depth value of a current depth block using the differential depth value,
wherein the predetermined binarization method refers to a coding method using a combination of unary binarization and fixed length binarization,
wherein a part of binary codes in the lookup table are comprised just a prefix part, and a rest of binary codes in the lookup table are comprised the prefix part and a suffix part,
wherein a number of the binary codes which are comprised just the prefix part is larger than a number of the binary codes which are comprised the prefix part and a suffix part, and
wherein the prefix part is binarized using a unary binarization and the suffix part is binarized using fixed length binarization.

8. The video decoder according to claim 7, wherein the intra-prediction unit acquires a predicted depth value of the current depth block.

9. The video decoder according to claim 7, wherein the entropy decoding unit acquires maximum differential depth index information, wherein the predetermined binarization method uses the maximum differential depth index information.

10. The video decoder according to claim 7, wherein the lookup table is configured as follows:

| Depth index information | Prefix part | Suffix part |
|---|---|---|
| 1 | 0 | |
| 2 | 10 | |
| 3 | 110 | |
| 4 | 1110 | |
| 5 | 11110 | |
| 6 | 111110 | |
| 7 | 1111110 | |
| 8 | 11111110 | |
| 9 | 111111110 | |
| 10 | 111111111 | 00 |
| 11 | 111111111 | 01 |
| 12 | 111111111 | 10 | wherein the number of the binary codes which are comprised just the prefix part is ¾ of a total number of the depth index information included in the lookup table, and wherein the number of the binary codes which are comprised the prefix part and the suffix part is ¼ of the total number of the depth index information included in the lookup table.

* * * * *